United States Patent
Nomura (10) Patent No.: US 8,425,058 B2
(45) Date of Patent: Apr. 23, 2013

(54) OPTICAL UNIT, IMAGE PICKUP DEVICE USING THE OPTICAL UNIT, AND ON-VEHICLE IMAGE DISPLAY DEVICE USING THE IMAGE PICKUP DEVICE

(75) Inventor: Tsubasa Nomura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1177 days.

(21) Appl. No.: 11/873,926

(22) Filed: Oct. 17, 2007

(65) Prior Publication Data
US 2008/0112050 A1 May 15, 2008

(30) Foreign Application Priority Data

Nov. 14, 2006 (JP) ................................ 2006-307468
Jul. 17, 2007 (JP) ................................ 2007-185684

(51) Int. Cl.
*G02B 1/10* (2006.01)
(52) U.S. Cl.
USPC ........................................ 359/507; 359/509
(58) Field of Classification Search .................. 359/507, 359/509
See application file for complete search history.

(56) References Cited

U.S. PATENT DOCUMENTS

| | | | | | |
|---|---|---|---|---|---|
| 3,432,297 | A | * | 3/1969 | Autry et al. ................. | 430/143 |
| 3,728,317 | A | * | 4/1973 | Blank ......................... | 525/330.2 |
| 3,895,155 | A | * | 7/1975 | Shukuri et al. .............. | 428/206 |
| 4,855,176 | A | * | 8/1989 | Ohwaki et al. .............. | 428/195.1 |
| 6,425,670 | B1 | * | 7/2002 | Komatsu et al. ............ | 359/507 |
| 6,803,079 | B2 | * | 10/2004 | Inaba ........................... | 427/536 |
| 6,835,350 | B2 | * | 12/2004 | Sasaki et al. ................ | 422/82.05 |
| 7,048,971 | B2 | * | 5/2006 | Arora ........................... | 427/402 |
| 7,161,616 | B1 | | 1/2007 | Okamoto et al. | |
| 7,561,340 | B2 | * | 7/2009 | Tseng et al. ................ | 359/665 |

FOREIGN PATENT DOCUMENTS

| | | |
|---|---|---|
| JP | 03-123335 | 5/1991 |
| JP | 05-232566 | 9/1993 |
| JP | 07-313442 | * 12/1995 |
| JP | 2002-079880 | 3/2002 |
| JP | 2002-344786 | 11/2002 |
| JP | 2007-14098 | 6/2007 |

OTHER PUBLICATIONS

Machine Translation from the Japan Patent Office Website for JP07-313442.
English Language Patent Abstract from the Japan Patent Office Website for JP07-313442.

* cited by examiner

*Primary Examiner* — Ricky D Shafer
(74) *Attorney, Agent, or Firm* — Brinks Hofer Gilson & Lione (57) ABSTRACT

A lens unit or the like with improved ability to capture proper images by reducing the likelihood that water droplets will adhere to the lens surface and change the refractive index. A surface of a lens portion (1) is imparted with a water-repellent property and a surface of a non-lens portion (2), surrounding the lens portion (1), is imparted with a hydrophilic property. As a result, if droplets on the surface of the lens portion (1) contact the non-lens portion (2), the droplets are guided from the water-repellent surface of the lens portion (1) to the hydrophilic surface of the non-lens portion (2) thereby reducing the number of droplets residing on the lens portion (1).

14 Claims, 9 Drawing Sheets

OPTICAL UNIT, IMAGE PICKUP DEVICE USING THE OPTICAL UNIT, AND ON-VEHICLE IMAGE DISPLAY DEVICE USING THE IMAGE PICKUP DEVICE

RELATED APPLICATIONS

The present application claims priority to Japanese Patent Application Numbers 2006-307468, filed Nov. 14, 2006, and 2007-185684, filed Jul. 17, 2007, the entirety of which are hereby incorporated by reference.

BACKGROUND OF THE INVENTION

1. Field of the Invention

The present invention relates to an optical unit, an image pickup device using the optical unit, and an on-vehicle image display device using the image pickup device.

2. Description of the Related Art

In recent years, there have been proposed systems for detecting an object in proximity to a driver's own vehicle by use of a camera mounted onto the vehicle. For example, an image captured with an on-vehicle camera is subjected to image recognition processing to determine a pixel position of the object in proximity to the vehicle in the captured image. Information about the set position and angle of the on-vehicle camera and the view angle of a lens is then used to convert the pixel position of the object in proximity to the vehicle in the captured image into an actual physical position relative to the vehicle (e.g. a distance and direction from the driver's own vehicle to the target object).

Typically, the on-vehicle camera operates in an environment where moisture droplets tend to adhere to the lens. If droplets adhere to the lens, light is refracted by the droplets, which adversely affects the image captured by the on-vehicle camera. On-vehicle camera lens surfaces are generally coated with a water-repellent material to prevent water deposit (see Japanese Unexamined Patent Application Publication No. 05-232566). However, because of this water-repellent coating, droplets tend to adhere to the lens in a ball-like shape. These water droplets can significantly affect the image captured by the camera.

In contrast, if the lens surface is coated with a hydrophilic material, water covers the entire lens screen, thereby changing the lens' refractive index. This change in the refractive index causes the captured image to be blurred, and a proper image cannot be obtained.

SUMMARY OF THE INVENTION

Accordingly, an object of the present invention is to reduce the likelihood that water droplets will adhere to the camera lens and interfere with image capture due to changes in refractive index.

One embodiment of the present invention includes an optical unit including a light transmissive portion with a water-repellent surface region, and a light non-transmissive portion that surrounds or contacts the light transmissive portion, wherein the light non-transmissive portion contains a hydrophilic surface region.

In this embodiment, it is possible to guide droplets that collect on the water-surface repellent surface of the light transmissive portion to the hydrophilic surface of the light non-transmissive portion, thereby effectively reducing the number of droplets residing on the light transmissive portion. Furthermore, it is possible to prevent droplets held in the non-transmissive portion from moving to the light transmissive portion.

The terms hydrophilic and water-repellent are defined in terms of a contact angle to water. The contact angle to water refers to the angle between the surface of the liquid water droplet and the surface of the solid object the water droplet is contacting, as is known in the art. The term "hydrophilic region" means a region with a contact angle to the water of 40 degrees or less. The term "water-repellent region" means a region with a contact angle to the water of more than 40 degrees. In the present invention, the contact angle of the "hydrophilic region" is preferably 20 degrees or less, and the contact angle of the "water-repellent region" is preferably 60 degrees or more.

Another embodiment of the present invention includes an optical unit containing a light transmissive portion; and a light non-transmissive portion surrounding the light transmissive portion. The light transmissive portion contains a surface region that is divided into a first region that is water-repellent and a second region that is hydrophilic.

When water droplets on the first region of the light transmissive portion contact the second region, it is possible to guide the droplets on the water-repellent first region to the hydrophilic second region, thereby reducing the number of droplets residing on the first region. Furthermore, this configuration prevents droplets residing in the second region from moving to the first region.

In addition, the optical unit of the present invention is used as an image pickup device as described below. If a surface region of the light transmissive portion of the image pickup device, which corresponds to a necessary portion of the captured image, is set to the water-repellent first region, and a surface region of the light transmissive portion of the image pickup device, which corresponds to an unnecessary portion of the captured image, is set to the hydrophilic second region, droplets are not likely to adhere to the first region. By reducing the likelihood that droplets will adhere to the first region, the refractive index is less likely to be changed, and the optical unit is more likely to capture a proper image.

In the embodiment described above, the surface region of the light non-transmissive portion is preferably a hydrophilic region. If so, droplets on the first region of the light transmissive region can be guided to the second region, up to the surface of the non-transmissive region to more effectively reduce the number of droplets residing on the first region.

Furthermore, in an embodiment of the present invention, the first region is preferably a central region of a lens portion, and the second region is preferably a peripheral region outside the central region.

In this embodiment, the hydrophilic region is preferably imparted with a hydrophilic property. More specifically, the hydrophilic region is preferably coated with a hydrophilic material or subjected to surface modification to give it hydrophilic properties.

Similarly, the water repellent region is preferably coated with a water-repellent material. To be specific, the water-repellent region is preferably coated with a water-repellent material or subjected to surface modification and thus given water-repellent properties.

In another embodiment of the present invention, the surface region of the light-transmissive portion and the surface region of the light non-transmissive portion are preferably coated with a water-repellent material. The hydrophilic region is formed by coating a predetermined portion of the water-repellent surface region with a hydrophilic material. This coating process allows the predetermined portion of the surface region of the lens pickup device to be appropriately processed and given a hydrophilic or water-repellent property as desired. Further, because the water-repellent region is formed below the hydrophilic region, there is no danger of droplets infiltrating into the lens through a gap between the light transmissive portion and the light non-transmissive portion. Thus, defects caused by the droplets being held on the surface of the hydrophilic region can be suppressed.

In this embodiment of the present invention, hydrophilicity preferably differs from one position in the hydrophilic region to another, in order to more effectively reduce the number of droplets residing on the light transmissive portion and prevent droplets held in the light non-transmissive portion from moving to the light transmissive portion.

In one embodiment of the present invention, the light non-transmissive portion is preferably the structure holding the light transmissive portion of the lens to the casing barrel of the optical unit.

In another embodiment, a drainage structure is preferably connected to the light non-transmissive portion in order to drain water from the surface region of the light non-transmissive portion to the outside. In this way, it is possible to prevent the light non-transmissive portion from holding too much water, and thereby prevent droplets held in the light non-transmissive portion from moving to the light transmissive portion.

In another embodiment, hydrophilicity of the surface region of the light non-transmissive portion increases toward the location of the drainage structure. In this way, droplets that adhere to the surface of the light transmissive portion can be appropriately guided to the drainage structure from the surface of the light non-transmissive portion, and the amount of water held on the light non-transmissive portion can be effectively controlled.

The drainage structure itself is preferably comprised of a thin tube member. In this case, droplets held on the surface of the light non-transmissive portion can be effectively absorbed and removed by capillary action.

Alternatively, the drainage structure is a linear member having a hydrophilic surface. In this case, droplets held on the surface of the light non-transmissive portion can be effectively drained to the outside of the unit along the linear member.

In an alternative embodiment, the drainage structure is a groove portion formed on a surface of the light non-transmissive portion. In this embodiment, droplets guided to the surface of the light non-transmissive portion can be held in the groove, thereby preventing the droplets held in the light non-transmissive portion from moving to the light transmissive portion.

Alternatively, the groove portion includes an open groove that extends up to an outer peripheral portion of the light non-transmissive portion. In this embodiment, droplets held in the groove can be easily drained to the outside of the unit from the open groove.

The groove portion may be located anywhere on the optical unit, but it is preferably formed along the periphery of the light transmissive portion. In this position, droplets are guided from the surface of the light transmissive portion to the surface of the light non-transmissive portion from any direction.

In an embodiment of the present invention, the light transmissive portion is applicable to a structure including a lens portion, where the lens portion is exposed at the surface of the light transmissive portion. Where the lens portion is exposed, it is possible to appropriately and effectively prevent droplets from residing on the surface of the lens portion.

An image pickup device may include an optical unit and an image pickup element located opposite to the surface of the light transmissive portion. Droplets are not likely to adhere to the surface of the light transmissive portion of the optical unit, and changes to refractive index are reduced as compared to the related art.

Further, in an on-vehicle image display device according to an embodiment of the present invention, the image pickup device is attached to a predetermined portion of a vehicle. The image pickup device captures an image of at least a portion of a peripheral region of the vehicle, and the captured image is processed into vehicle peripheral information. In this embodiment, as compared to the related art, more accurate vehicle peripheral information can be obtained because droplets are less likely to adhere to the surface of the light transmissive portion and change the refractive index.

Further, according to an embodiment of the present invention, the image pickup device preferably includes an optical unit. The optical unit is divided into two regions. The first region corresponds to an image pickup region necessary for obtaining the vehicle peripheral information. The second region corresponds to an image pickup region not necessary for obtaining the vehicle peripheral information. In this embodiment, droplets are not likely to adhere to the image pickup region necessary for obtaining the vehicle peripheral information, and proper vehicle peripheral information can be obtained.

In an alternative embodiment, if the image pickup device is attached to the vehicle such that a light transmissive portion of the image pickup device is oriented obliquely downward or parallel to the ground, hydrophilicity is varied in the hydrophilic region to gradually increase from an upper portion to a lower portion of the hydrophilic region.

In another alternative embodiment, if the image pickup device is attached to the vehicle such that a light transmissive portion of the image pickup device is oriented down toward the ground, hydrophilicity is varied in the hydrophilic region to gradually increase in a direction opposite to a moving direction of the vehicle. Thus, hydrophilicity gradually increases from the front portion of the hydrophilic region to the rear portion of the hydrophilic region. This configuration makes it possible to effectively prevent droplets from adhering to the surface of the light transmissive portion of the image pickup device when obtaining vehicle peripheral information. Thus, the image pickup device can more accurately obtain vehicle peripheral information as compared with the related art.

Alternatively, if the image pickup device is attached to the vehicle such that a light transmissive portion of the image pickup device is oriented obliquely downward or parallel to the ground, a drainage structure is connected to a lower portion of the hydrophilic region.

On the other hand, if the image pickup device is attached to the vehicle such that a light transmissive portion of the image pickup device is oriented down toward the ground, the drainage structure is preferably connected to a rear portion of the light transmissive portion, which is located on the opposite side with respect to the direction the vehicle is moving. Thus, it is possible to effectively prevent droplets from adhering to the surface of the light transmissive portion of the image pickup device when obtaining vehicle peripheral information.

In another embodiment, if the image pickup device is attached to the vehicle such that a light transmissive portion of the image pickup device is oriented obliquely downward or parallel to the ground, an open groove is formed below the light non-transmissive portion.

In the event that the image pickup device is attached to the vehicle such that a light transmissive portion of the image pickup device is oriented down toward the ground, open groove is formed in a rear portion of the light non-transmissive portion with respect to the direction the vehicle is moving. In this way, it is possible to effectively prevent droplets from adhering to the surface of the light transmissive portion of the image pickup device. Thus, more accurate vehicle peripheral information can be obtained as compared with the related art.

One embodiment of the on-vehicle image display device of the present invention uses a plurality of image pickup elements attached to different portions of the vehicle. The image pickup elements are used to obtain vehicle peripheral information with a virtual eye point set directly above the vehicle (a top view display).

In this embodiment, droplets on the light transmissive portion of the image pickup elements can be guided from the water-repellent light transmissive portion to the hydrophilic light non-transmissive portion. This reduces the number of droplets residing on the light transmissive portion. Furthermore, droplets held in the light non-transmissive portion can be prevented from moving to the light transmissive portion.

Moreover, it is also possible to guide droplets residing on the first region of the light transmissive portion from the water-repellent first region to the hydrophilic second region. The droplets that adhere to the second region can also be prevented from moving to the first region.

Further, the optical unit of the present invention can be used as an image pickup device. If a surface region of the light-transmissive surface portion corresponding to a necessary portion of the captured image is set to the water-repellent first region, and a surface region of the light transmissive portion, corresponding to an unnecessary portion of the captured image, is set to the hydrophilic second region, droplets are not likely to adhere to the first region. By reducing the likelihood that droplets will adhere to the first region (the light-transmissive region corresponding to the necessary image), changes in refractive index can be suppressed, and proper images can be captured.

Furthermore, if a drainage structure is provided to the light non-transmissive portion, it is possible to prevent too much water from being held on the surface of the light non-transmissive portion. By removing droplets from the light non-transmissive portion, it is possible to prevent droplets held on the surface of the light non-transmissive portion from moving to the light transmissive portion. Thus, droplets are not likely to adhere to the surface of the light transmissive portion and changes in the refractive index are suppressed as compared with the related art. Accordingly, the optical unit or units can capture proper images, and more accurate vehicle peripheral information can be obtained.

BRIEF DESCRIPTION OF THE DRAWINGS

FIGS. 1A and 1B illustrate an image pickup device including a lens unit (optical unit) according to a first embodiment of the present invention, where

FIGS. 3A and 3B illustrate the result of putting a droplet on a non-lens portion 2 (the "ring cap," or structure holding the light transmissive portion 1 to the casing barrel of the optical unit) with the image pickup device including the lens unit of the first embodiment being directed downward, in which

FIGS. 5A and 5B illustrate a lens unit according to a third embodiment of the present invention, where

FIGS. 6A and 6B illustrate another embodiment of the lens unit, where

FIGS. 7A and 7B illustrate a lens unit according to a fourth embodiment of the present invention, where

DESCRIPTION OF THE PREFERRED EMBODIMENTS

First Embodiment

Figure 1A:
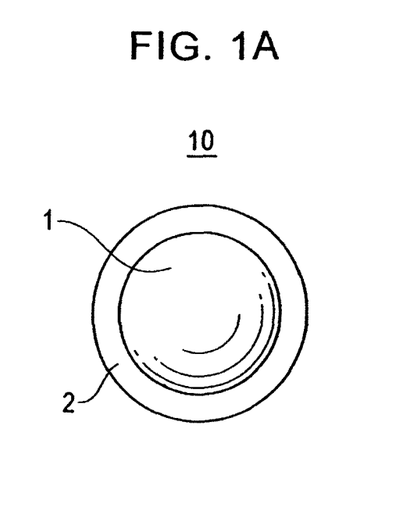
FIG. 1A is a top view of the lens unit and FIG. 1B is a side view of the image pickup device.
Figure 1B:
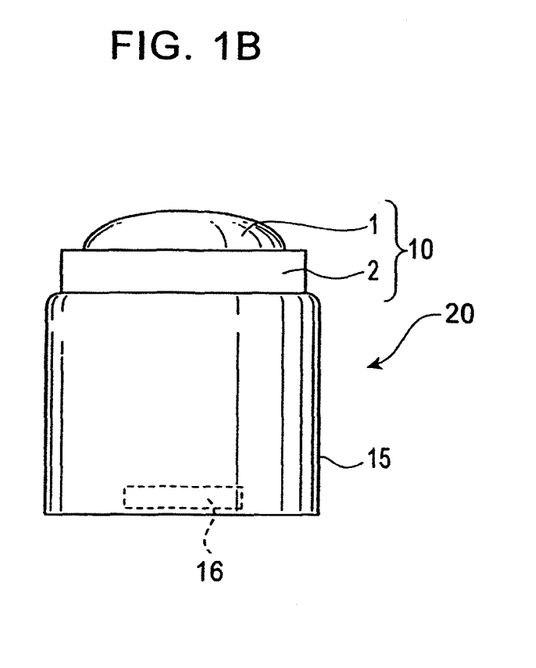

Hereinafter, embodiments of the present invention will be described with reference to the accompanying drawings. FIGS. 1A and 1B show a structural example of an image pickup device 20 including a lens unit (optical unit) 10 according to a first embodiment of the present invention. FIG. 1A is a top view of the lens unit 10. FIG. 1B is a side view of the image pickup device 20.

As shown in FIGS. 1A and 1B, the lens unit 10 of the first embodiment includes a lens portion (light transmissive portion) 1 and a non-lens portion (light non-transmissive portion) 2 surrounding the lens portion 1. In this embodiment, the non-lens portion 2 is the structure holding the light transmissive portion to the casing barrel 15 of the optical unit, also called a ring cap, which contacts an outer edge of the lens portion 1.

The lens portion 1 may be made of glass or plastics. The non-lens portion 2 may be made of a resin, metal, or the like.

If the lens portion 1 is formed of glass, the lens generally has a small contact angle to the water (of about 20 to 30 degrees) and tends to show hydrophilicity, although this depends on the glass material used. In this specification, the term "hydrophilic property" means a property where the contact angle to the water is 40 degrees or less. In contrast, a resin-made lens generally has large contact angle to the water (of about 70 to 90 degrees) and tends to show water repellency, although the actual contact angle to the water is dependant on the resin material used.

Thus, in this embodiment, the surface of the lens portion 1 is imparted with a water-repellent property, and the surface of the non-lens portion 2 is imparted with a hydrophilic property. As a result, in this embodiment, the contact angle to water can be set to 40 degrees or less for the "hydrophilic region" of the surface of the non-lens portion 2, and to more than 40 degrees at "water-repellent region" of the surface of the lens portion 1. Furthermore, in this embodiment, it is preferred that the contact angle to water be set to 20 degrees or less at the surface of the non-lens portion 2 as the "hydrophilic region," and to 60 degrees or more at the surface of the lens portion 1 as the "water-repellent region".

The surface of the lens portion 1 may be coated with a water-repellent material containing, for example, a fluorine compound or a silicon compound. The water-repellent material may be applied to the lens portion 1 by applying a water-repellent paint or coating, or pasting a water-repellent coating seal or coating film thereto. Alternatively, the lens portion 1 surface may be subjected to surface modification and thus imparted with a water-repellent property.

The surface of the non-lens portion 2 may be coated with a hydrophilic material containing, for example, polyvinyl alcohol or polyacrylamide. The hydrophilic material may be applied to the non-lens portion 2 by applying a hydrophilic coating or pasting a coating seal or coating film thereto. Alternatively, the surface of the non-lens portion 2 may be subjected to surface modification and thus imparted with a hydrophilic property.

In the event the non-lens portion 2 is made of a resin with high hydrophilicity, the processes for applying a hydrophilic material described above may be omitted. However, when determining which material to use for the non-lens portion 2, the material's hydrophilic properties are not the primary consideration. Thus, it is preferred to coat the surface of the non-lens portion 2 with a hydrophilic material in order to modify the hydrophilicity of the non-lens portion 2 surface.

In this embodiment, the entire surface of both the lens portion 1 and the non-lens portion 2 are coated with a water-repellent material. The surface of the non-lens portion 2, which is coated with the water-repellent material, is then coated with a hydrophilic material. In this way a predetermined portion of the lens unit 10 can be coated with a water-repellent material and a hydrophilic material as appropriate. In addition, in the non-lens portion 2, because the water-repellent coating is applied below the hydrophilic coating there is no danger of droplets infiltrating into the lens from a gap between the lens portion 1 and the non-lens portion 2, thereby suppressing defects caused by the droplets being held on the surface of the hydrophilic region of the non-lens portion 2.

Figure 2:
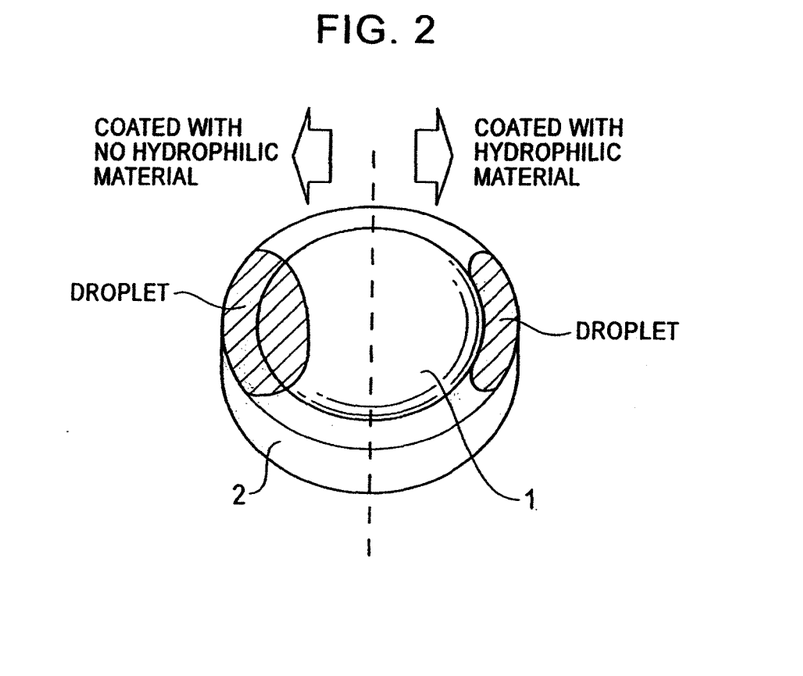
FIG. 2 is a schematic diagram illustrating the result of putting one droplet on a lens portion of the first embodiment.

FIG. 2 is a schematic diagram showing a result of putting one droplet on the water-repellent region of the surface of the lens portion 1. In FIG. 2, the surface of the non-lens portion 2 is divided into a portion coated with a hydrophilic material and a portion not coated with a hydrophilic material to illustrate the effect of coating the surface of the non-lens portion (ring cap) 2 with a hydrophilic material.

As shown in FIG. 2, when a water droplet is placed on the hydrophilic side (right side of FIG. 2) of lens portion 1, the droplet contacts the surface of the non-lens portion 2 and is then guided along the hydrophilic coating to move along the non-lens portion 2 and extend around the outside of the lens portion 1. In contrast, when a water droplet is placed on the non-hydrophilic side (left side of FIG. 2) of the lens portion 1, the droplet is not guided away from the lens portion 1, thus the droplet remains covering a part of the lens portion 1.

Figure 3A:
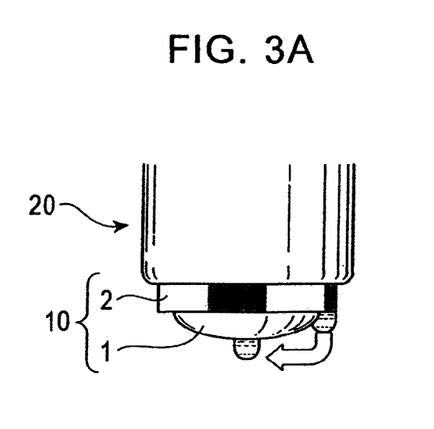
FIG. 3A is a side view of the image pickup device, where the surface of the non-lens portion is not coated with a hydrophilic material.
Figure 3B:
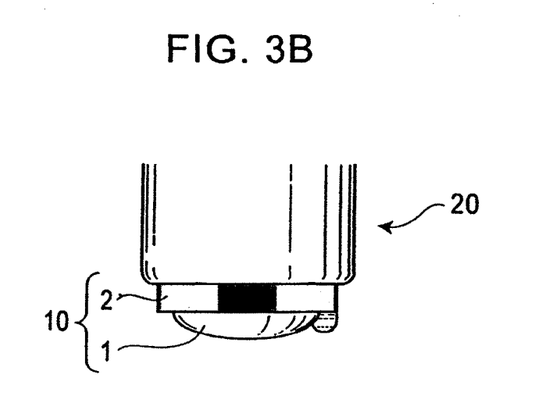
FIG. 3B is a side view of the image pickup device where the surface of the non-lens portion is coated with a hydrophilic material.

FIGS. 3A and 3B show a result of putting a droplet on the non-lens portion (ring cap) 2 with the lens unit 10 being directed downward. FIG. 3A shows the lens unit in the case where the surface of the non-lens portion 2 is not coated with a hydrophilic material. FIG. 3B shows the lens unit in the case in which the surface of the non-lens portion 2 is coated with a hydrophilic material.

As shown in FIG. 3A, if the surface of the non-lens portion 2 is not coated with a hydrophilic material, a droplet that adheres to the surface of the non-lens portion 2 is repelled and moved to the lens portion 1 surface by gravity. For example, if the image pickup device 20 including the lens unit 10 is mounted downward relative to the vehicle, droplets adhering to the surface of the non-lens portion 2 tend to move to the surface of the lens portion 1 due to vibrations that accompany driving. In contrast, if the surface of the non-lens portion 2 is coated with a hydrophilic material, as shown in FIG. 3B, droplets can be easily held on the surface of the non-lens portion 2 and prevented from moving to the lens portion 1 surface.

As described above, according to the lens unit 10 of the first embodiment, droplets that come in contact with the water-repellent region of the surface of the lens portion 1 are easily moved to the hydrophilic region of the surface of the non-lens portion 2. Furthermore, droplets that come in contact with the hydrophilic region of the surface of the non-lens portion 2 are not likely to move to the surface of the lens portion 1, and are easily held on the surface of the non-lens portion 2. As a result, it is possible to reduce the number of droplets adhering to the surface of the lens portion 1. Therefore, if the image pickup device 20 including the lens unit 10 is mounted on a vehicle, the effect of water droplets contacting the lens unit 10 on the images captured by the image pickup device 20 can be suppressed, even on a rainy day.

As shown in FIGS. 1A and 1B, the lens unit 10 of this embodiment partially constitutes the image pickup device 20. The lens unit 10 is supported on the surface side of a casing (barrel) 15. The casing 15 incorporates an image pickup element 16 that is placed on the optical axis of the lens unit 10. The pickup element 16 is intended to receive light focused by the lens unit 10 and transmit an electric signal of a formed image.

The lens portion 1 may be a fish-eye lens. The casing (barrel) 15 may incorporate plural lenses.

In the image pickup device 20 of FIGS. 1A and 1B, the surface of the lens portion 1 is exposed to the environment. In this embodiment, it is possible to appropriately reduce the number of droplets residing on the lens portion 1 even if the surface of the lens portion 1 of the lens unit 10 is exposed.

In an alternative embodiment, if a transparent covering member (constituting a part of the light transmissive portion) is attached to the surface of the lens portion 1 to prevent the surface of the lens portion 1 from being damaged, the surface of the covering member is modified to accommodate the water-repellent region as described above.

Second Embodiment

Figure 4:
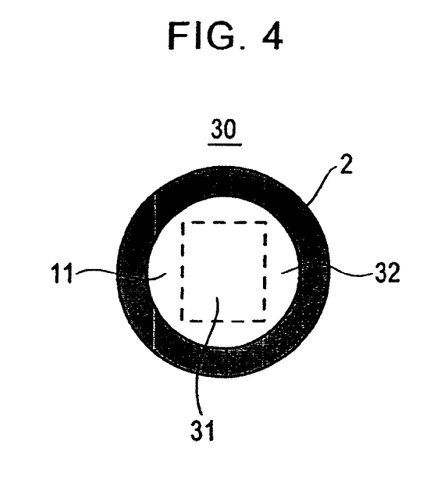
FIG. 4 illustrates a top view of a lens unit according to a second embodiment of the present invention.

Next, a second embodiment of the present invention will be described with reference to the accompanying drawings. FIG. 4 shows a structural example of a lens unit 30 according to the second embodiment of the present invention. The components in FIG. 4 have the same functions as those of the components of FIGS. 1A and 1B, and are therefore denoted by similar reference numerals.

As shown in FIG. 4, the lens unit 30 of the second embodiment includes a lens portion (light transmissive portion) 11 and a non-lens portion (light non-transmissive portion) 2 surrounding the lens portion. In the first embodiment described above, the entire surface of the lens portion 1 is coated with a water-repellent material, and the surface of the peripheral non-lens portion 2 is coated with a hydrophilic material. In contrast, in the second embodiment, as shown in FIG. 4, a central region 31 of the surface of the lens portion 11 is imparted with a water-repellent property, and a peripheral region 32 other than the central region 31 is imparted with a hydrophilic property. The central region 31 of the surface of the lens portion 11 can be of any shape and is not limited to the rectangular shape depicted in FIG. 4.

In general, the central region 31 of the lens portion 11 transmits subject light corresponding to the portion of the captured image that is actually used. The central region 31 protrudes more than any other portion of the lens portion 11 and thus, droplets tend to adhere thereto. Because droplets tend to adhere to the central region 31 of the lens portion 11, the central region 31 is imparted with a water-repellent property, and the peripheral region 32 of the lens portion 11 is imparted with a hydrophilic property.

In contrast, the peripheral region 32 transmits subject light corresponding to an unnecessary and unused portion of the total captured image. Thus, even if droplets adhere to the peripheral region 32, the portion of the image that is actually used is not affected because the peripheral region, which is coated with a hydrophilic material, guides the water droplets on the central region 31 to the peripheral region 32. In this way, water droplets can easily move from the central region 31 to the peripheral region 32 of the lens portion 11, and it is possible to prevent the droplets from adhering to the central portion 31 of the lens portion 11 and adversely affecting the image. Additionally, in the second embodiment, the water-repellent central region 31 and the hydrophilic peripheral region 32 exist on the surface of the lens portion 11, so droplets can easily move from the central region 31 to the peripheral region 32 of the lens portion 11, even without the vibrations caused by the vehicle running.

While the central region 31 is coated with a water-repellent material and the peripheral region 32 is coated with a hydrophilic material in the second embodiment, the present invention is not limited to this configuration. That is, provided a first region of a lens portion that transmits subject light corresponding to an actually used image is coated with a water-repellent material, and a second region of a lens portion that transmits subject light corresponding to an unnecessary image is coated with a hydrophilic material, the first region is not limited to being a central region and the second region is not limited to being a peripheral region.

As with the first embodiment shown in FIGS. 1A and 1B, in the second embodiment it is preferable to impart the surface of the non-lens portion (ring cap) 2 with a hydrophilic property. If the non-lens portion 2 is imparted with a hydrophilic property, droplets on the central region 31 of the lens portion 11 can be easily guided up to the surface of the non-lens portion 2 from the peripheral region 32, and it is possible to effectively reduce the number of droplets residing on the central region 31.

Furthermore, in the structure described above, hydrophilicity is set higher at the surface of the non-lens portion 2 than in the peripheral region 32. This difference in hydrophilicity guides the droplets more easily from the peripheral region 32 to the surface of the non-lens portion 2, and more effectively reduces the number of droplets residing on the central region 31.

Third Embodiment

Figure 5A:
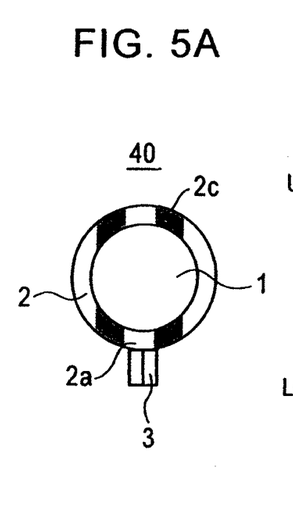
FIG. 5A is a top view of the lens unit and FIG. 5B is a side view of the image pickup device.
Figure 5B:
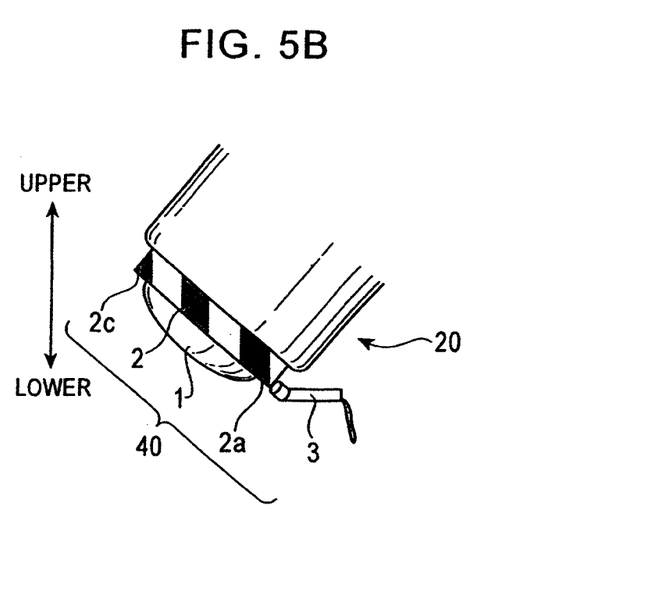

Next, a third embodiment of the present invention will be described. FIGS. 5A and 5B show a structural example of a lens unit 40 according to the third embodiment of the present invention. FIG. 5A is a top view of the lens unit 40, and FIG. 5B shows how the image pickup device 20 including the lens unit 40 is mounted. The components in FIGS. 5A and 5B having have the same functions as those of the components of FIGS. 1A and 1B are denoted by similar reference numerals.

In the lens unit 40 of the third embodiment, a drainage structure 3 for draining water from the surface of the non-lens portion 2 to the outside of the unit is provided to the non-lens portion (ring cap) 2. In this embodiment, the drainage structure 3 is a thin tube member. If the drainage structure 3 is made up of a thin tube member, droplets held on the surface of the non-lens portion 2 can be effectively absorbed through capillary action. The capillary action draws the liquid along the length of the tube. How much the liquid moves along the tube is determined by surface tension or wettability of the tube wall surface. Thus, it is desirable that the tube member is made of a material with high surface tension or wettability.

As described in the first embodiment, if the surface of the non-lens portion 2 surrounding the lens portion 1 is coated with a hydrophilic material, droplets are held on the surface of the non-lens portion 2 and can be effectively prevented from moving to the lens portion 1. However, if too much water is held on the surface of the non-lens portion 2, droplets might move to the surface of the lens portion 1. To avoid such a situation, as shown in FIGS. 5A and 5B, the drainage structure 3 is connected to the non-lens portion 2 to control the amount of water held on the surface of the non-lens portion 2, further improving the ability of the lens unit to prevent droplets from moving to the surface of the lens portion 1.

As shown in FIG. 5B, if the image pickup device 20 including the lens unit 40 is oriented such that the lens portion 1 of the lens unit 40 is angled obliquely downward toward the ground, the drainage structure 3 is preferably connected to a lower portion 2a of the non-lens portion 2. In this arrangement, droplets adhering to the surface of the non-lens portion 2 easily move to the lower drainage structure 3 by gravity. Hence, by removing droplets from the surface of the lens portion 2, the drainage structure enhances the ability of the non-lens portion 2 to keep droplets away from the lens portion 1.

In addition, hydrophilicity may differ from one portion to another on the surface of the non-lens portion 2. For example, in FIG. 5A, hydrophilicity of the surface of the non-lens portion 2 is preferably adjusted to gradually increase from an upper portion 2c (upper portion of FIG. 5A), which is farthest from the drainage structure 3, to the lower portion 2a (lower portion of FIG. 5A), which is closest to the drainage structure 3. In this configuration, droplets adhering to the upper side of the non-lens portion 2 move toward the lower side of the non-lens portion 2 with higher hydrophilicity where the drain structure 3 is located. Thus, by removing droplets from the surface of the lens portion 2, the drainage structure enhances the ability of the non-lens portion 2 to keep droplets away from the lens portion 1.

Figure 6A:
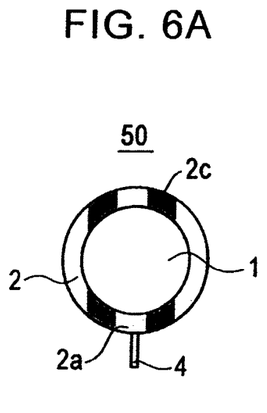
FIG. 6A is a top view of the lens unit and FIG. 6B is a side view of the image pickup devices.
Figure 6B:
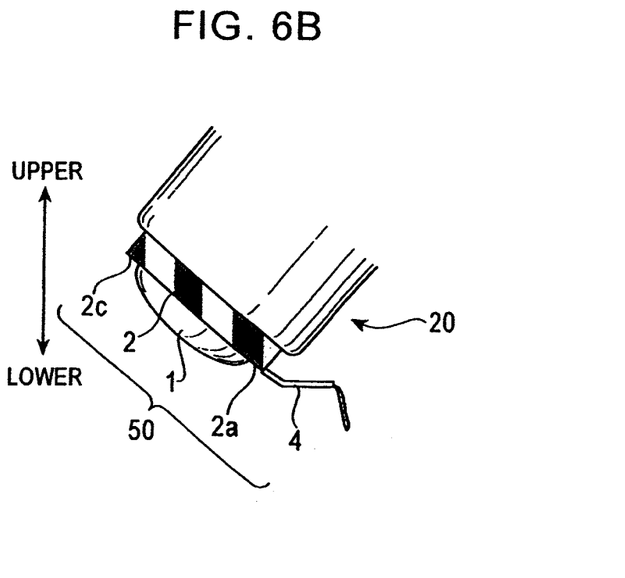

In FIGS. 5A and 5B, the drainage structure 3 is made up of a thin tube member. FIGS. 6A and 6B illustrate an alternative embodiment of the drainage structure 3 of FIGS. 5A and 5B. In FIGS. 6A and 6B, the drainage structure 4 is a linear member with a hydrophilic surface. The drainage structure 4 is connected to the surface of the non-lens portion 2. In this arrangement, droplets held on the surface of the non-lens portion 2 can be drained to the outside of the unit via the linear member, and the surface of the non-lens portion 2 does not need to hold too much water. Thus, the drainage structure 4 enhances the non-lens portion's 2 effectiveness in preventing droplets from contacting the surface of the lens portion 1.

If the image pickup device 20 including the lens unit 50 is mounted on the vehicle such that the lens portion 1 of the lens unit 50 is oriented obliquely downward to the ground as shown in FIG. 6B, the drainage structure 4 is preferably connected to the lower portion 2a of the non-lens portion 2. If so, droplets adherent to the non-lens portion 2 surface can be easily moved to the lower drain structure 4 by gravity. As a result, the ability of the drainage structure 4 to drain droplets held on the surface of the non-lens portion 2 can be further improved.

Further, as described above in the example of FIG. 5A, the hydrophilicity of the surface of the non-lens portion 2 in FIGS. 6A and 6B is preferably adjusted to gradually increase from the upper portion 2c (upper portion of FIG. 6A) farthest from the drainage structure 4 to the lower portion 2a (lower portion of FIG. 6A) closest to the drainage structure 3.

Fourth Embodiment

Figure 7A:
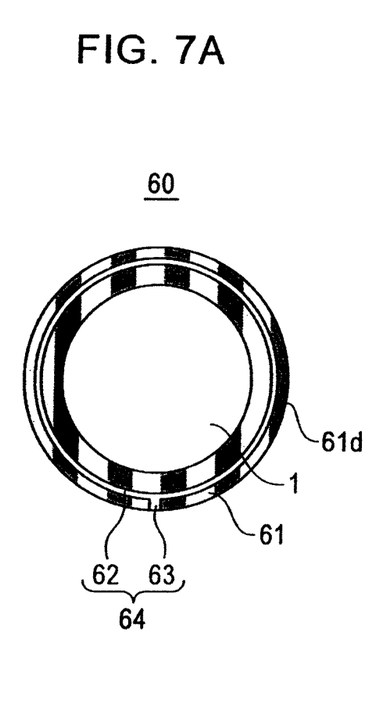
FIG. 7A is a top view of the lens unit and FIG. 7B is a side view of the image pickup device.
Figure 7B:
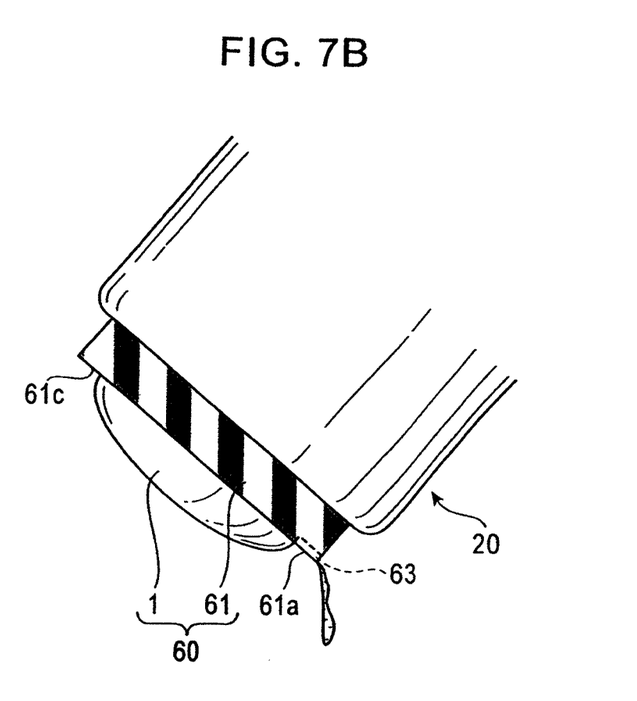

Next, a fourth embodiment of the present invention will be described with reference to the accompanying drawings. FIGS. 7A and 7B show a structural example of a lens unit 60 according to the fourth embodiment of the present invention. FIG. 7A is a top view of the lens unit 60 and FIG. 7B shows how the image pickup device 20 including the lens unit 60 is mounted. The components in FIGS. 7A and 7B having the same functions as those of the components of FIGS. 1A and 1B are denoted by like reference numerals.

In the lens unit 60 of the fourth embodiment, a groove portion 64 is formed in the surface of a non-lens portion (ring cap) 61. The groove 64 includes a ring-like groove 62 formed around the lens portion 1, and an open groove 63 connected to the ring-like groove 62 and extending from the ring-like groove 62 up to an outer edge 61d of the non-lens portion 61. The wall surface and bottom surface of the groove portion 64 are both hydrophilic.

As a result, droplets guided to the surface of the non-lens portion 61 from the lens portion 1 surface can be appropriately held in the groove portion 64, and the droplets held in the non-lens portion 61 can be prevented from moving to the lens portion 1.

In FIGS. 7A and 7B, the ring-like groove 62 is formed around the lens portion 1. Hence, the droplets can be properly guided to the groove portion 64 irrespective of the direction the droplets enter the non-lens portion 61 from the lens portion 1.

As shown in FIGS. 7A and 7B, an open groove 63 is formed in the groove portion 64, which extends up to the outer edge 61d of the non-lens portion 61, so water in the groove portion 62 can be properly drained to the outside of the unit from the open groove 63.

Further, where the image pickup device 20 including the lens unit 60 is mounted to the vehicle such that the lens portion 1 of the lens unit 60 is oriented obliquely downward to the ground as shown in FIGS. 7A and 7B, water can be drained effectively from the open groove 63 to the outside of the unit if the open groove 63 is formed in a lower portion 61a of the non-lens portion 61.

In FIGS. 7A and 7B, if hydrophilicity of an inner portion of the groove portion 64 is set higher than that of the surface of the non-lens portion 61, droplets are easily guided to the groove portion 64, and the amount of water held on the surface of the non-lens portion 61 can be reduced.

Furthermore, the form of the groove portion 64 is not limited to that of FIG. 7A. For example, the groove portion 64 may be composed of only the ring-like groove 62. Alternatively, the groove portion 64 may be composed only of the open groove 63. Moreover, the groove portion may be formed only in the lower half of the non-lens portion 61 where water tends to accumulate, if the ring-like groove 62 is intermittently formed or the image pickup device 20 is oriented obliquely downward to the ground as shown in FIG. 7B.

As described above, the image pickup device 20 including the lens units 10, 30, 40, 50, and 60 described in the first to fourth embodiments is attached at a predetermined position on a vehicle, and used for an on-vehicle image display device that captures an image around the vehicle and processes the captured image into vehicle peripheral information.

Figure 8:
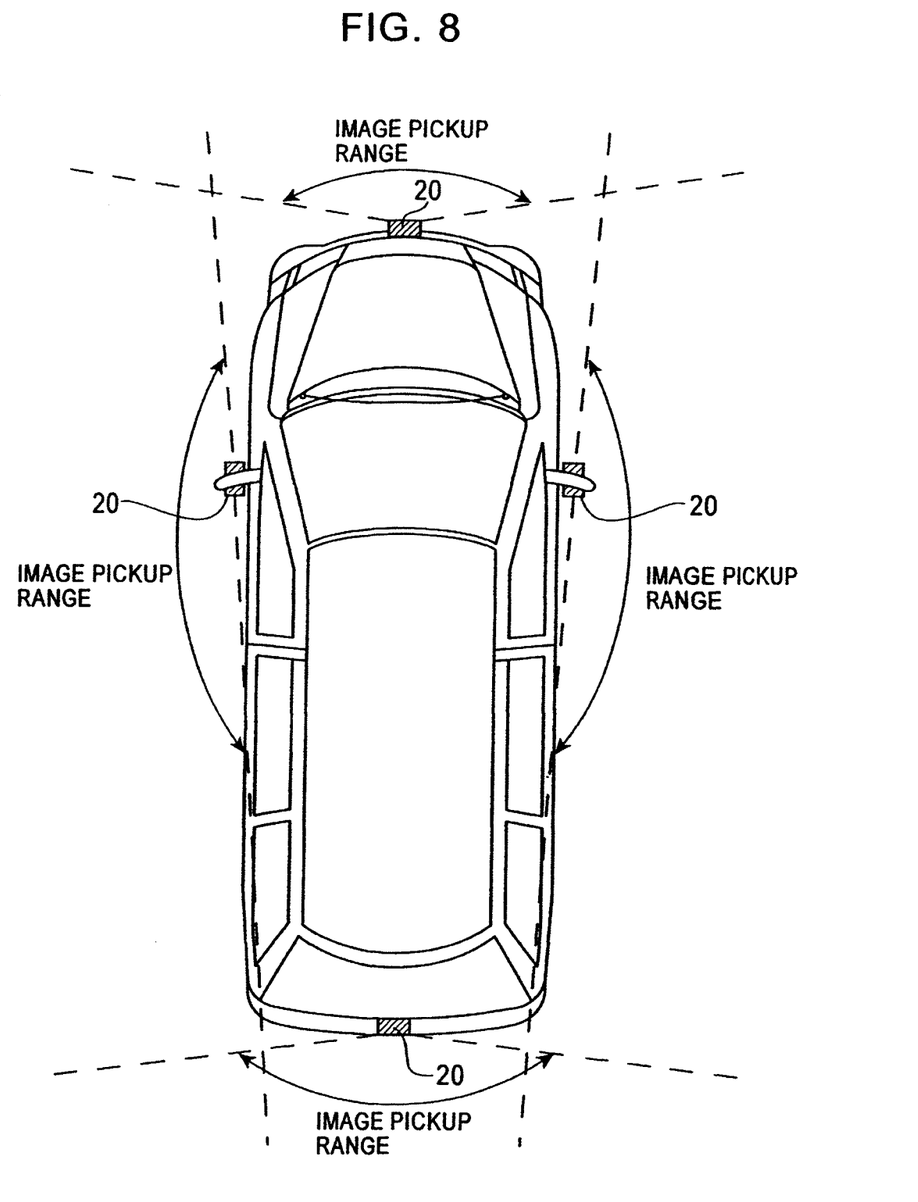
FIG. 8 illustrates a top view of a vehicle showing how an image pickup device (on-vehicle camera) is mounted.

As shown in FIG. 8, for example, the image pickup devices (on-vehicle cameras) 20 of this embodiment are attached to a front side, a rear side, a left side, and a right side of a vehicle. The lens portion 1 of each image pickup device 20 may be a fish-eye lens. FIG. 8 shows an image pickup range of each image pickup device 20.

The on-vehicle image display device includes a storage unit for storing an image captured with each image pickup device 20, a data unit for a vehicle image, an eye point converting unit for converting a virtual eye point to an actual one, a vehicle peripheral image generating unit, a control unit, and the like.

For example, as shown in FIG. 8, the on-vehicle image display device is used to combine images captured with each image pickup device 20 in order to obtain vehicle peripheral information (top view display) with a virtual eye point set directly above the vehicle.

Figure 9:
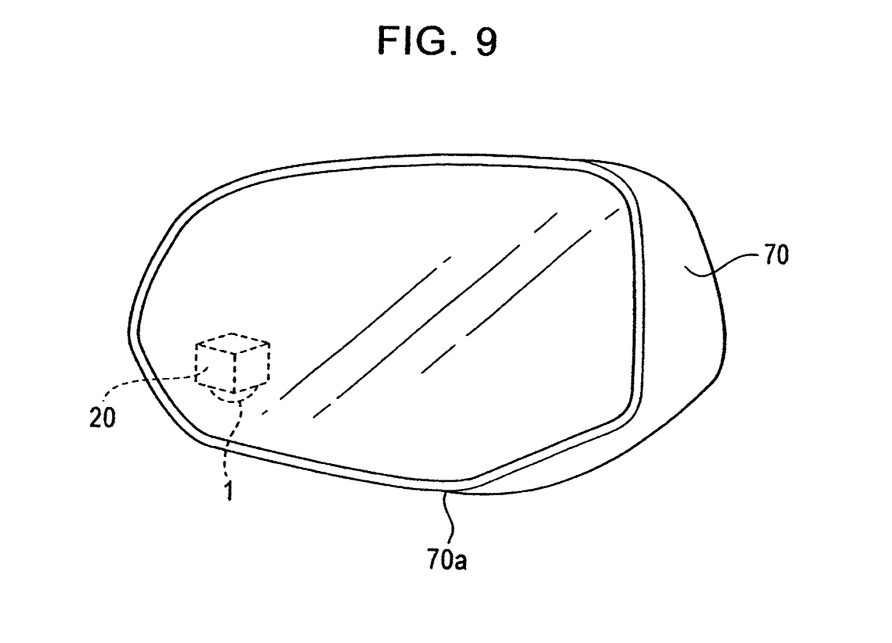
FIG. 9 illustrates a side mirror and an image pickup device (on-vehicle camera) attached to the side mirror.

As shown in FIG. 9, the image pickup devices 20 on the right and left sides of the vehicle can each be attached to a lower portion 70a of a side mirror 70 with the lens portion 1 surface oriented down toward the ground. The lens portion 1 of the image pickup device 20 is exposed to the outside environment from the lower portion 70a of the side mirror 70.

Figure 10:
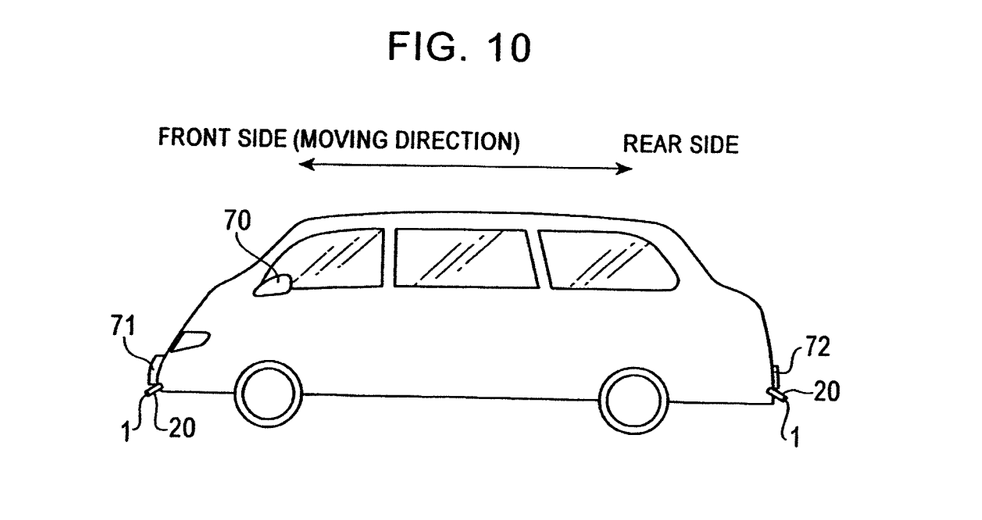
FIG. 10 illustrates a vehicle and image pickup devices (on-vehicle cameras) attached to front and rear sides of the vehicle.

Further, as shown in FIG. 10, another image pickup device 20 is attached below a bumper portion 71 on the front side of the vehicle, such that the lens portion 1 of the image pickup device 20 is directed to the front side of the vehicle and obliquely downward to the ground. In addition, as shown in FIG. 10, another image pickup device 20 is attached below a license plate 72 on the rear side of the vehicle, such that the lens portion 1 of the image pickup device 20 is directed to the rear side of the vehicle and obliquely downward to the ground. Image pickup devices 20 can be located virtually anywhere on the vehicle and are not limited to the positions described above.

Figure 11:
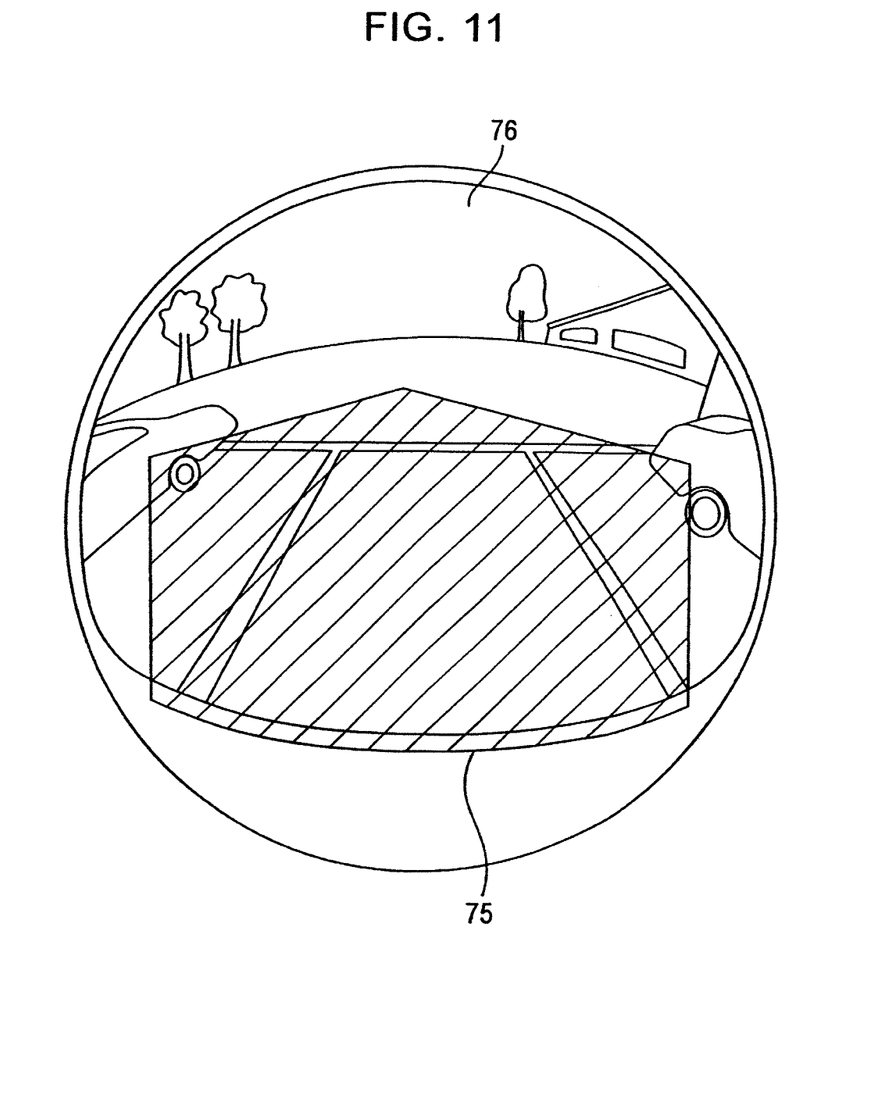
FIG. 11 illustrates a screen displaying an image captured with the image pickup device.

FIG. 11 shows an image captured with the image pickup device 20 attached to the rear side of the vehicle. In FIG. 11, an image pickup region 75, as denoted by a shaded portion of FIG. 11, is the only image necessary for the top view display. Image pickup region 76, other than the shaded portion, depicts the portion of the captured image that is unnecessary for the top view display. In this example, the image pickup region 75, located substantially in the center of the image of FIG. 11, corresponds to the first region 31 of FIG. 4 as the water-repellent region of the surface of the lens portion 11 of the lens unit. The image pickup region 76 that surrounds the image pickup region 75 corresponds to the second region 32 of FIG. 4 as a hydrophilic region of the surface of the lens portion 11 of the lens unit 30.

As a result, droplets are not likely to adhere to the image pickup region 75, which is necessary for top view display. Thus, a proper image can be captured, and a proper top view display can be obtained.

It should be noted that the first region 31 is preferably set to an area somewhat larger than the image pickup region 75, other than the shaded portion, because it is possible to more effectively prevent droplets from adhering to the image pickup region 75 necessary for top view display.

Furthermore, if hydrophilicity differs from one portion to another in the hydrophilic region of the lens unit, it is preferred to adjust the hydrophilicity for each of the image pickup devices 20 that are mounted at different portions of the vehicle and in different directions as follows.

Figure 12A:
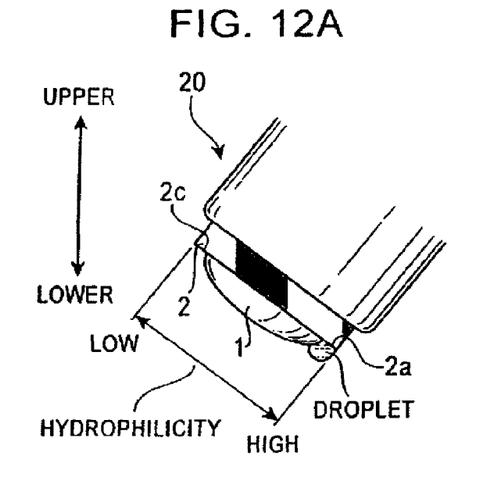
FIGS. 12A and 12B illustrate side views of an image pickup device showing preferred hydrophilicity at the surface of a non-lens portion, where the image pickup device is attached at different positions of the vehicle in different directions.

If the image pickup devices 20 are attached to the front and rear sides of the vehicle, as illustrated in FIG. 10, with the lens portion 1 oriented obliquely downward to the ground as shown in FIG. 12A, the hydrophilicity of the surface of the non-lens portion 2 is preferably adjusted to gradually increase toward the lower portion.

Thus, droplets guided to the surface of the non-lens portion 2 from the surface of the lens portion 1 can be easily guided from the upper portion of the image pickup device 20 (with lower hydrophilicity), to the lower portion of the image pickup device 20 (with higher hydrophilicity). Droplets retained in the lower portion $2a$ of the surface of the non-lens portion 2 are likely to be drained to the lower side by gravity, not back to the surface of the lens portion 1. Thus, it is possible to more effectively reduce the number of droplets residing on the surface of the lens portion 1. Accordingly, droplets are not likely to adhere to the lens portion 1 as compared with the related art, and vehicle peripheral information (top view display) can be properly obtained.

Figure 12B:
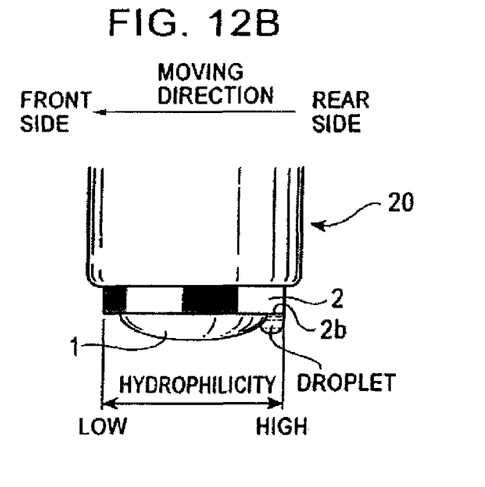

As shown in FIG. 12B, if the image pickup devices 20 are attached to the side mirrors 70 of the vehicle, as illustrated in FIG. 9, with the lens portion 1 oriented down toward the ground as shown in FIG. 12A, the hydrophilicity of the surface of the non-lens portion 2 is preferably adjusted to gradually increase along a direction opposite to the direction the vehicle is moving.

In FIG. 12B, the term "moving direction" means a forward direction of the vehicle, as shown in FIG. 10. That is, the "moving direction" does not refer to a backward direction of the vehicle (rolling backward).

If the hydrophilicity of the surface of the non-lens portion 2 is adjusted as shown in FIG. 12B, a wind pressure is applied to the lens portion 1 and the non-lens portion 2 during movement, and droplets are guided from the surface of the lens portion 1 to the surface of the non-lens portion 2. The droplets are further guided up to a rear portion $2b$ of the non-lens portion 2. In addition, when the vehicle is moving, the wind pressure increases the likelihood that droplets retained in the rear portion $2b$ of the surface of the non-lens portion 2 will move to the rear side of the image pickup device 20, and away from the surface of the lens portion 1. In this way, it is possible to effectively prevent droplets from residing on the lens portion 1 surface. Thus, droplets are not likely to adhere to the lens portion 1 as compared with the related art, and the vehicle peripheral information (top view display) can be properly obtained.

As shown in FIG. 12A, an image pickup device 20 attached to the front side of the vehicle is directed to the front side of the vehicle, such that the lens portion 1 and the non-lens portion 2 are subject to wind pressure when the vehicle is moving. However, the lower portion $2a$ of the surface of the non-lens portion 2, which has a high hydrophilicity, is positioned on the side opposite to the upper portion $2c$ of the surface of the non-lens portion 2, which has low hydrophilicity, with respect to the moving direction of the vehicle. In this configuration, when wind pressure is applied to the image pickup device 20, droplets tend to move to the lower portion $2a$ of the high hydrophilicity non-lens portion 2. Droplets guided up to the lower portion $2a$ of the surface of the non-lens portion 2, are easily drained to the rear side of the image pickup device 20, particularly when the vehicle is moving. Thus, this configuration effectively reduces the amount of water retained in the lower portion $2a$ of the non-lens portion 2.

Subsequently, when using an image pickup device 20 including the lens units 40 and 50 with the drainage structures 3 or 4, as shown in FIGS. 5A and 5B or FIGS. 6A and 6B, it is preferred to adjust hydrophilicity for each of the image pickup devices 20 with respect to their different mounting positions and directions.

If the image pickup devices 20 are attached to the front and rear sides of the vehicle, as shown in FIG. 10, with the lens portion 1 oriented obliquely downward to the ground, as shown in FIGS. 5B and 6B, it is preferred that the drainage structures 3 and 4 are connected to the lower portion $2a$ of the surface of the non-lens portion 2.

As a result, droplets guided from the surface of the lens portion 1 to the surface of the non-lens portion 2, can be easily drained from the surface of the non-lens portion 2 to the outside through the drainage structures 3 and 4. Thus, it is possible to effectively reduce the number of droplets residing on the surface of the lens portion 1, and proper vehicle peripheral information (top view display) can be obtained as compared with the related art.

The image pickup device 20 attached to the front side of the vehicle has the lens portion 1 directed to the front side of the vehicle. In this configuration, the lens portion 1 and the non-lens portion 2 are susceptible to wind pressure during movement. However, the lower portion $2a$ of the surface of the non-lens portion 2, which has high hydrophilicity, is positioned on the side opposite to the upper portion $2c$ of the surface of the non-lens portion 2, which has low hydrophilicity, with respect to the moving direction of the vehicle. Therefore, when wind pressure is applied to the image pickup device 20, the droplets are likely to be drained to the rear portion of the image pickup device 20 through the drainage structures 3 and 4. Droplets retained in the lower portion $2a$ of the surface of the non-lens portion 2 can be effectively reduced.

Figure 13:
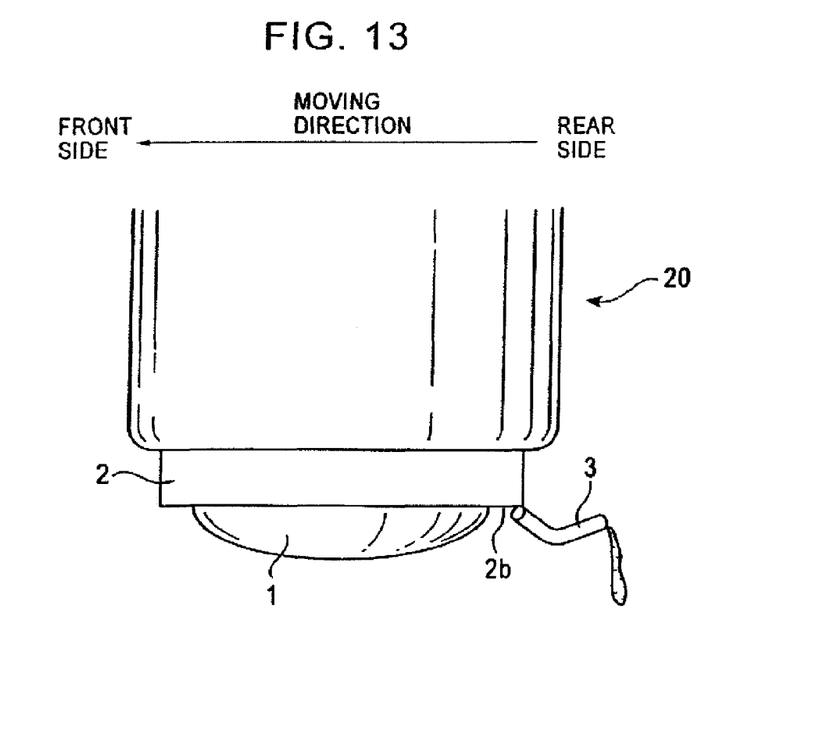
FIG. 13 illustrates a side view of an image pickup device in a preferred mounting position, where the image pickup device includes a drainage structure.

Further, as shown in FIG. 13, if the image pickup devices 20 are attached to the side mirrors 70 of the vehicle with the lens portion 1 oriented down toward the ground, as illustrated in FIG. 9, the drainage structure 3 (and drain structure 4) is preferably connected to the rear portion $2b$ of the surface of the non-lens portion 2 on the opposite side with respect to the moving direction of the vehicle.

Thus, when the vehicle is moving and wind pressure is applied to the lens portion 1 and the non-lens portion 2, droplets move from the surface of the lens portion 1 to the surface of the non-lens portion 2 and up to the rear portion $2b$ of the surface of the non-lens portion 2. The droplets are then drained to the rear portion of the image pickup device 20 through the drainage structures 3 and 4. Thus, it is possible to effectively prevent droplets from residing on the surface of the lens portion. Accordingly, droplets are not likely to adhere to the lens portion 1 as compared with the related art, and proper vehicle peripheral information (top view display) can be obtained.

Subsequently, when using the image pickup device 20 including the lens unit 60 of FIGS. 7A and 7B with the groove portion 64 formed in the surface of the non-lens portion 61 of FIGS. 7A and 7B, it is preferred to adjust hydrophilicity for each of the image pickup devices 20 mounted at different positions in different directions.

If the image pickup devices 20 are attached to the front and rear sides of the vehicle, as shown in FIG. 10, with the lens portion 1 oriented obliquely downward to the ground, as shown in FIG. 7B, it is preferred that the open groove 63 of the groove portion 64 is formed in the lower portion 61*a* of the surface of the non-lens portion 61.

As a result, droplets guided to the surface of the non-lens portion 2 from the surface of the lens portion 1 and then held in the groove portion 64 can be easily drained to the outside from the open groove 63 of the groove portion 64. Thus, it is possible to effectively reduce the number of droplets residing on the surface of the lens portion 1. Hence, droplets are not likely to adhere to the lens portion 1 as compared with the related art, and proper vehicle peripheral information (top view display) can be obtained.

Furthermore, an image pickup device 20 attached to the front side of the vehicle has the lens portion 1 directed to the front side of the vehicle. In this configuration the lens portion 1 and the non-lens portion 61 are susceptible to a wind pressure when the vehicle is moving. However, the lower portion 61*a* of the high hydrophilicity surface of the non-lens portion 61 is positioned on the side opposite the low hydrophilicity upper portion 61*c* with respect to the moving direction of the vehicle. When wind pressure is applied to the image pickup device 20, droplets are likely to be drained to the rear portion of the image pickup device 20 from the open groove 63. Thus, droplets retained in the surface of the non-lens portion 2 can be effectively reduced.

Figure 14:
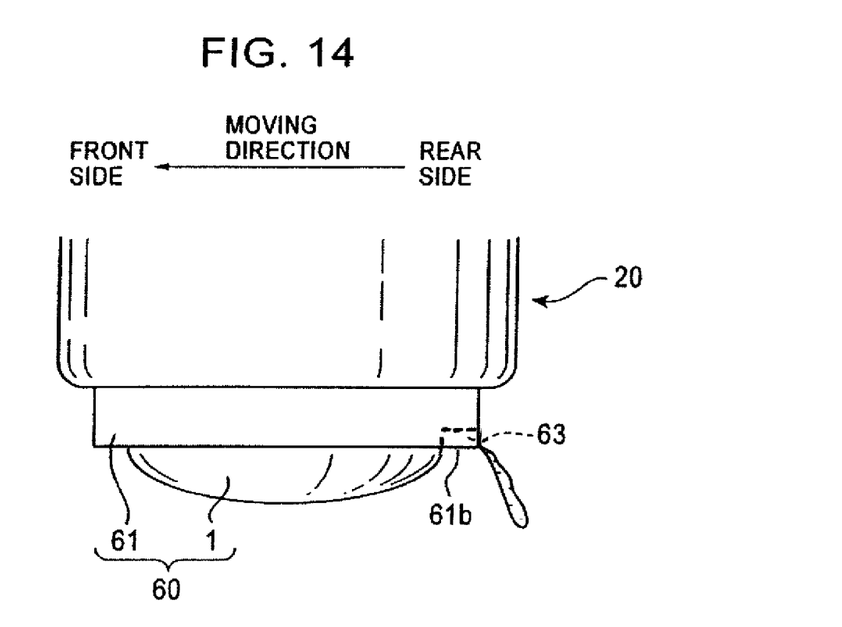
FIG. 14 illustrates a side view of an image pickup device in a preferred mounting position, where the image pickup device includes a groove formed in the non-lens portion.

Further, as shown in FIG. 14, if the image pickup devices 20 are attached to the side mirrors 70 of the vehicle with the lens portion 1 oriented down toward the ground, as illustrated in FIG. 9, the open groove 63 is preferably formed in the rear portion 63*b* of the surface of the non-lens portion 2. The rear portion 63*b* of the non-lens portion 2 is located on the opposite side with respect to the moving direction of the vehicle.

Thus, when wind pressure is applied to the lens portion 1 and the non-lens portion 61 while the vehicle is moving, droplets move from the surface of the lens portion 1 to the surface of the non-lens portion 61, and are easily drained up to the rear portion of the image pickup device 20 through the open groove 63 formed in the rear portion 61*b* of the surface of the non-lens portion 61. This configuration effectively prevents droplets from residing on the lens portion 1 surface. Accordingly, droplets are not likely to adhere to the lens portion 1 as compared with the related art, and proper vehicle peripheral information (top view display) can be obtained.

In the above embodiments, the vehicle peripheral information is a top view, but the present invention is applicable to a front view, a side view, and a back view, or an oblique view.

Further, in the above-described preferred embodiments, the image pickup devices 20 are attached with the lens portion 1 oriented obliquely downward to the ground or oriented down toward the ground. However, the present invention is not limited thereto. If the image pickup devices 20 are attached with the lens portion 1 oriented parallel to the ground, it is preferred to adopt the same structure and operation as those of the image pickup devices attached with the lens portion 1 oriented obliquely downward to the ground.

However, if the image pickup devices 20 are attached to the vehicle with the lens portion 1 oriented parallel to the ground, the vehicle peripheral information includes a large area of unnecessary sky image or the like. Therefore, in general, the image pickup devices 20 area attached to the vehicle with the lens portion 1 oriented obliquely downward to the ground or oriented down toward the ground.

Further, in the above embodiments, the image pickup device 20 is described as an on-vehicle camera, but the image pickup device is applicable to various cameras such as a monitoring camera, a digital camera, and a digital video camera. Among those cameras, the image pickup device of the present invention is particularly useful as an on-vehicle camera or monitoring camera, which can accumulate water droplets that cannot be easily removed by a driver.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An optical unit comprising:
   a light transmissive portion; and
   a light non-transmissive portion adjacent the light transmissive portion,
   wherein the light transmissive portion includes a water-repellent surface region and the light non-transmissive portion includes a hydrophilic surface region;
   wherein hydrophilicity in the hydrophilic surface region increases toward a predetermined drainage location; and
   the surface region of the light-transmissive portion and the surface region of the light non-transmissive portion includes a first coating of a water-repellent material, and a second coating over a portion of the first coating of the water-repellent material, wherein the second coating comprises a hydrophilic material, and covers the portion of the first coating corresponding to the hydrophilic surface region of the light non-transmissive portion.

2. The optical unit according to claim 1, wherein a drainage structure is connected to the light non-transmissive portion.

3. The optical unit according to claim 1, wherein the hydrophilicity of the surface region of the light non-transmissive portion increases toward the location of a drainage structure.

4. The optical unit according to claim 3, wherein the drainage structure comprises a thin tube member.

5. The optical unit according to claim 3, wherein the drainage structure comprises a linear member having a hydrophilic surface.

6. The optical unit according to claim 3, wherein a groove portion is formed in the hydrophilic surface region of the light non-transmissive portion.

7. The optical unit according to claim 6, wherein the groove portion includes an open groove that extends to an outer peripheral portion of the light non-transmissive portion.

8. The optical unit according to claim 3, wherein the light transmissive portion includes a transparent covering member, wherein the transparent covering member covers a portion of the water-repellant surface region of the light transmissive portion.

9. An optical unit comprising:
a light transmissive portion;
a light non-transmissive portion adjacent the light transmissive portion; and,
an image pickup device located opposite a surface of the light transmissive portion;
wherein the light transmissive portion includes a water-repellant surface region and the light non-transmissive portion includes a hydrophilic surface region;
wherein hydrophilicity varies in the hydrophilic surface region; and,
wherein the image pickup device is attached to a vehicle such that a light transmissive portion of the image pickup device is oriented non-perpendicular to a ground, wherein the hydrophilicity varies in the hydrophilic region to gradually increase from an upper portion to a lower portion of the hydrophilic region.

10. The optical unit according to claim 9, wherein the image pickup device is attached to the vehicle such that the light transmissive portion of the image pickup device is oriented down toward the ground, wherein the hydrophilicity gradually increases in a direction opposite to a moving direction of the vehicle.

11. The optical unit according to claim 10, wherein the image pickup device is attached to the vehicle such that the light transmissive portion of the image pickup device is oriented down toward the ground, and a drainage structure is connected to a rear portion of the light non-transmissive portion located on a side opposite the moving direction of the vehicle.

12. The optical unit according to claim 11, wherein a groove portion is formed in the hydrophilic surface region of the light non-transmissive portion, and the groove portion includes an open groove that extends to an outer peripheral portion of the light non-transmissive portion.

13. The optical unit according to claim 9, wherein the optical unit of the image pickup device further comprises a drainage structure connected to the lower portion of the hydrophilic region of the light non-transmissive portion, and the image pickup device is attached to the vehicle such that the light transmissive portion of the image pickup device is oriented non-perpendicular to the ground.

14. The optical unit according to claim 13, wherein a groove portion is formed in the hydrophilic surface region of the light non-transmissive portion, and the groove portion includes an open groove that extends to an outer peripheral portion of the light non-transmissive portion.

\* \* \* \* \*

UNITED STATES PATENT AND TRADEMARK OFFICE
CERTIFICATE OF CORRECTION

PATENT NO. : 8,425,058 B2
APPLICATION NO. : 11/873926
DATED : April 23, 2013
INVENTOR(S) : Tsubasa Nomura

It is certified that error appears in the above-identified patent and that said Letters Patent is hereby corrected as shown below:

In the Claims

In column 16, claim 1, line 41, after "first coating of" replace "a water-repellent" with --the water-repellent--.

In column 17, claim 9, line 10, before "hydrophilicity varies" insert --the--.

Signed and Sealed this
Sixth Day of May, 2014

Michelle K. Lee
*Deputy Director of the United States Patent and Trademark Office*